United States Patent
Abe et al.

(10) Patent No.: US 10,350,753 B2
(45) Date of Patent: Jul. 16, 2019

(54) DEVICE AND METHOD FOR DETECTING ABNORMALITY OF JOINT OF PARALLEL LINK ROBOT

(71) Applicants: FANUC CORPORATION, Yamanashi (JP); TOKYO INSTITUTE OF TECHNOLOGY, Tokyo (JP)

(72) Inventors: Kenichiro Abe, Yamanashi (JP); Yunfeng Wu, Yamanashi (JP); Hikaru Yamashiro, Yamanashi (JP); Yukio Takeda, Tokyo (JP); Yusuke Sugahara, Tokyo (JP); Daisuke Matsuura, Tokyo (JP); Masumi Ohno, Tokyo (JP)

(73) Assignees: FANUC CORPORATION, Yamanashi (JP); TOKYO INSTITUTE OF TECHNOLOGY, Tokyo (JP)

( * ) Notice: Subject to any disclaimer, the term of this patent is extended or adjusted under 35 U.S.C. 154(b) by 53 days.

(21) Appl. No.: 15/608,987

(22) Filed: May 30, 2017

(65) Prior Publication Data

US 2017/0348855 A1   Dec. 7, 2017

(30) Foreign Application Priority Data

Jun. 3, 2016 (JP) .................. 2016-112118

(51) Int. Cl.
  *B25J 9/16* (2006.01)
  *B25J 9/00* (2006.01)
  *B25J 19/02* (2006.01)

(52) U.S. Cl.
  CPC ........... *B25J 9/1633* (2013.01); *B25J 9/0051* (2013.01); *B25J 9/1664* (2013.01); *B25J 9/1674* (2013.01);

(Continued)

(58) Field of Classification Search
  None
  See application file for complete search history.

(56) References Cited

U.S. PATENT DOCUMENTS 2,475,293 A * 7/1949 Archer, Jr. .............. B64C 27/12
  416/102
4,697,986 A * 10/1987 David ..................... B64C 27/72
  416/114

(Continued)

FOREIGN PATENT DOCUMENTS

CN    101200066 A    6/2008
CN    102431043 A    5/2012

(Continued)

OTHER PUBLICATIONS

Herman Bruyninckx in Robot Kinematics and Dynamics, Aug. 21, 2010, 184 pages.*

(Continued)

*Primary Examiner* — Tung S Lau
(74) *Attorney, Agent, or Firm* — Hauptman Ham, LLP (57) ABSTRACT

A device and method for easily detecting an abnormality of a joint part of a delta-type parallel link robot having a link ball structure, by estimating a friction torque of a ball joint of the robot. A controller of the robot has: a control section configured to control the motion of the robot; a torque measurement section configured to measure or calculate, during the robot is operated, an amount of change in a drive torque, based on a current value of the motor, before and after the robot represents a specified posture where a sign of a relative angular velocity between a ball and a housing of the ball joint is changed; and a judgment section configured to judge that, when the measured amount of change in the drive torque exceeds a predetermined threshold, a friction state of the ball joint corresponding to the motor is abnormal.

3 Claims, 5 Drawing Sheets (52) U.S. Cl.
CPC ............. *B25J 9/1676* (2013.01); *B25J 19/02* (2013.01); *G05B 2219/37373* (2013.01); *Y10T 74/20329* (2015.01)

(56) References Cited

U.S. PATENT DOCUMENTS

| | | | |
|---|---|---|---|
| 7,735,385 | B2 | 6/2010 | Wilson et al. |
| 2003/0178528 | A1* | 9/2003 | Zoppitelli ............... B64C 27/35 244/7 R |
| 2003/0197482 | A1* | 10/2003 | Osuka .................. B23Q 1/5462 318/568.21 |
| 2008/0140321 | A1 | 6/2008 | Blanc et al. |
| 2010/0101359 | A1 | 4/2010 | Breu et al. |
| 2012/0065781 | A1 | 3/2012 | Ikeda et al. |

FOREIGN PATENT DOCUMENTS

| | | |
|---|---|---|
| JP | 2002-529258 A | 9/2002 |
| JP | 2005-186183 A | 7/2005 |
| JP | 2006-281421 A | 10/2006 |
| JP | 2008-40930 A | 2/2008 |
| JP | 2009-248289 A | 10/2009 |
| JP | 2013-52501 A | 3/2013 |
| JP | 2014-46406 A | 3/2014 |
| WO | 00/27597 A1 | 5/2000 |

OTHER PUBLICATIONS

Charles W. Wampler in Numerical Algebraic Geometry and Algebraic Kinematics, Jan. 14, 2011, 87 pages.*

Joseph Q. Oberhauser in Design, Construction, Control, and Analysis of Linear Delta Robot Apr. 2016, 136 pages.*

Ana C. Majarena in an Overview of Kinematic and Calibration Models Using Internal/External Sensors or Constraints to Improve the Behavior of Spatial Parallel Mechanisms, Nov. 16, 2010, 42 pages.*

Marsette Vona in Eye-In-Hand Visual Servoing with a 4-Joint Robot Arm, Feb. 2010, 15 pages.*

Hiroaki Funabashi et al., "Motion Analysis of Planar Linkages with Consideration of Clearances and Friction (Comprehension of Contact States at Revolute and Prismatic Pairs)", Transactions of the Japan Society of Mechanical Engineers (Series C), vol. 62, No. 600, pp. 276-281, Aug. 1996, 6pp.

Motoji Yamamoto et al., "A Dynamics Calculation Method for Parallel Link Robots—Calculation of Reaction Force for the Base Frame-", Proceedings of the 27th Annual Conference of the Robotics Society of Japan DVD-ROM, Journal of Robotics Society of Japan, Sep. 2009, 5pp.

* cited by examiner

DEVICE AND METHOD FOR DETECTING ABNORMALITY OF JOINT OF PARALLEL LINK ROBOT

RELATED APPLICATIONS

The present application claims priority to Japanese Patent Application No. 2016-112118 filed Jun. 3, 2016, the disclosure of which is hereby incorporated by reference herein in its entirety.

BACKGROUND OF THE INVENTION

1. Field of the Invention

The present invention relates to a device and method for detecting an abnormality of a joint of a parallel link robot.

2. Description of the Related Art

As means for positioning a movable part having an end effector in three-dimensions, a parallel link robot having a delta-type parallel link mechanism is well known. The delta-type parallel link robot has a base part, a movable part, and a drive link and a passive (driven) link for connecting the movable part to the base part. In many cases, the parallel link robot has three pairs of drive links and passive links, and the movable part can be moved with three degrees-of-freedom (X, Y, Z) by individually controlling the motion of each pair.

Generally, the passive link and the drive link are connected via a ball joint having three degrees-of-freedom, and the passive link and the movable part are also connected via a ball joint having three degrees-of-freedom. For example, JP 2002-529258 A discloses a configuration of a ball joint, in which a ball is geometrically separated from a housing, and the ball is biased toward the housing by an elastic material such as a spring. Further, JP 2014-046406 A discloses an example of a joint of a parallel link robot, having a link-ball structure in which a ball and a hosing are unified so that the ball is not easily separated from the housing.

On the other hand, it is a conventional technique to early detect an abnormality of the motion of a robot, and then limit decrease in a working ratio of the robot. For example, JP 2005-186183 A discloses an abnormality judging method including: calculating an estimated current position based on a command position by a low-pass filter having a time constant corresponding to an inverse number of a position loop gain; calculating an absolute value of a difference between the estimated current position and an actual current position detected by an encoder attached to a servomotor; calculating a total observer feedback quantity based on a torque command value for driving the servomotor, a differential value of the actual position and a known disturbance torque; calculating an abnormality detection threshold based on the total observer feedback quantity and an estimated velocity obtained by differentiate the estimated current position; and judging that an abnormality occurs in the robot when the absolute value is larger than the abnormality detection threshold.

Further, JP 2006-281421 A discloses an abnormality detecting method including: measuring a natural frequency of a robot arm with respect to a joint of a robot body; setting a constant velocity motion, in which the robot arm resonates most by vibration generated by a drive motor and a speed reducer, as an operating condition for detecting an abnormality of the robot body; and judging that an abnormality occurs in the robot body when a variable torque value calculated from a motor torque value corrected by using a temperature sensor provided to the drive motor or the speed reducer exceeds a predetermined threshold.

In the configuration as described in JP 2002-529258 A, when a collision or unexpectedly high speed motion occurs, a binding force for holding the ball in the housing at the joint of the passive link may be lowered, whereby the joint may be disassembled.

On the other hand, in the configuration of JP 2014-046406 A, the ball is not easily separated from the housing due to a mechanical connection, when a collision, etc., occurs. In this regard, when an elastic force such as the spring is used as in the JP 2002-529258 A, the friction force of the ball joint may be kept substantially constant due to the elastic force. On the other hand, in the link ball structure as in the JP 2014-046406 A, the friction force may be significantly varied due to a distance between plate hole centers or a production variation in the link ball. Further, when a foreign substance enters a ball sliding portion of the link ball, the sliding motion of the ball joint cannot be smoothly performed, and the friction force thereof may be excessively increased.

When the friction force of the ball joint is excessively increased, a torque of the drive motor is also increased. As a result, continuous motion performance of the robot may be deteriorated, an excess load may be applied to each component of the link structure, and/or excess heat may be generated at the ball joint, whereby an unexpected malfunction may occur. Generally, a delta-type robot is used when high-speed motion is required, and thus a hand or peripheral equipment of the robot may be seriously damaged if the above malfunction occurs. Therefore, when an abnormality occurs in the ball joint, it is desired that the abnormality be detected or recognized as soon as possible.

It may be difficult to detect an abnormality of the ball joint of the delta-type parallel link robot by using the method of JP 2005-186183 A or JP 2006-281421 A, since the ball joint of the delta-type parallel link robot is a passive joint which follows the posture of the robot, and is positioned away from the drive side (drive motor), and thus it is difficult to detect the friction state of the passive joint.

SUMMARY OF THE INVENTION

Therefore, an object of the present invention is to provide a device and method for easily detecting an abnormality of a joint part of a delta-type parallel link robot having a link ball structure, by estimating a friction torque (sliding wear) of a ball joint of the robot.

Accordingly, one aspect of the present invention provides a method for detecting an abnormality of a joint part of a parallel link robot, the parallel link robot comprising: a base part; a movable part positioned away from the base part; two or more link parts which connect the movable part to the base part, each link part including one degree-of-freedom relative to the base part; and a plurality of motors which respectively drive the link parts, wherein each link part comprises: a drive link connected to the base part; two passive links which extend parallel to each other and connect the drive link to the movable part; a pair of first ball joints which connect the passive links to the drive link; a pair of second ball joints which connect the passive links to the movable part; and a restraining plate positioned between the pair of first ball joints so as to restrict a rotation of the two passive links about each axis of the robot, and wherein the method comprises the steps of: measuring, during the parallel link robot is operated, an amount of change in a drive torque, based on a current value of the motor, before and after the robot represents a specified posture where a sign of a relative angular velocity between a ball and a housing of each of the first and second ball joints is changed; and judging that, when the amount of change in the drive torque exceeds a predetermined threshold, a friction state of the ball joint corresponding to the motor is abnormal.

In a preferred embodiment, the method comprises the steps of: identifying a friction torque of each ball joint of the parallel link robot by utilizing a multivariable linear regression method using a dynamics analysis, with respect to the obtained amount of change in the drive torque, based on a dynamics model of the parallel link robot including a friction force model of the ball joint and mechanical parameters including loads of a workpiece and a hand attached to the movable part, information of inertia, and a mass and dimensions of the parallel link robot; and determining a position where a malfunction occurs and a degree of the malfunction.

Another aspect of the present invention provides a device for detecting an abnormality of a joint part of a parallel link robot, the parallel link robot comprising: a base part; a movable part positioned away from the base part; two or more link parts which connect the movable part to the base part, each link part including one degree-of-freedom relative to the base part; and a plurality of motors which respectively drive the link parts, wherein each link part comprises: a drive link connected to the base part; two passive links which extend parallel to each other and connect the drive link to the movable part; a pair of first ball joints which connect the passive links to the drive link; a pair of second ball joints which connect the passive links to the movable part; and a restraining plate positioned between the pair of first ball joints so as to restrict a rotation of the two passive links about each axis of the robot, and wherein the device comprises: a torque measurement section configured to measure, during the parallel link robot is operated, an amount of change in a drive torque, based on a current value of the motor, before and after the robot represents a specified posture where a sign of a relative angular velocity between a ball and a housing of each of the first and second ball joints is changed; and a judgment section configured to judge that, when the amount of change in the drive torque exceeds a predetermined threshold, a friction state of the ball joint corresponding to the motor is abnormal.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
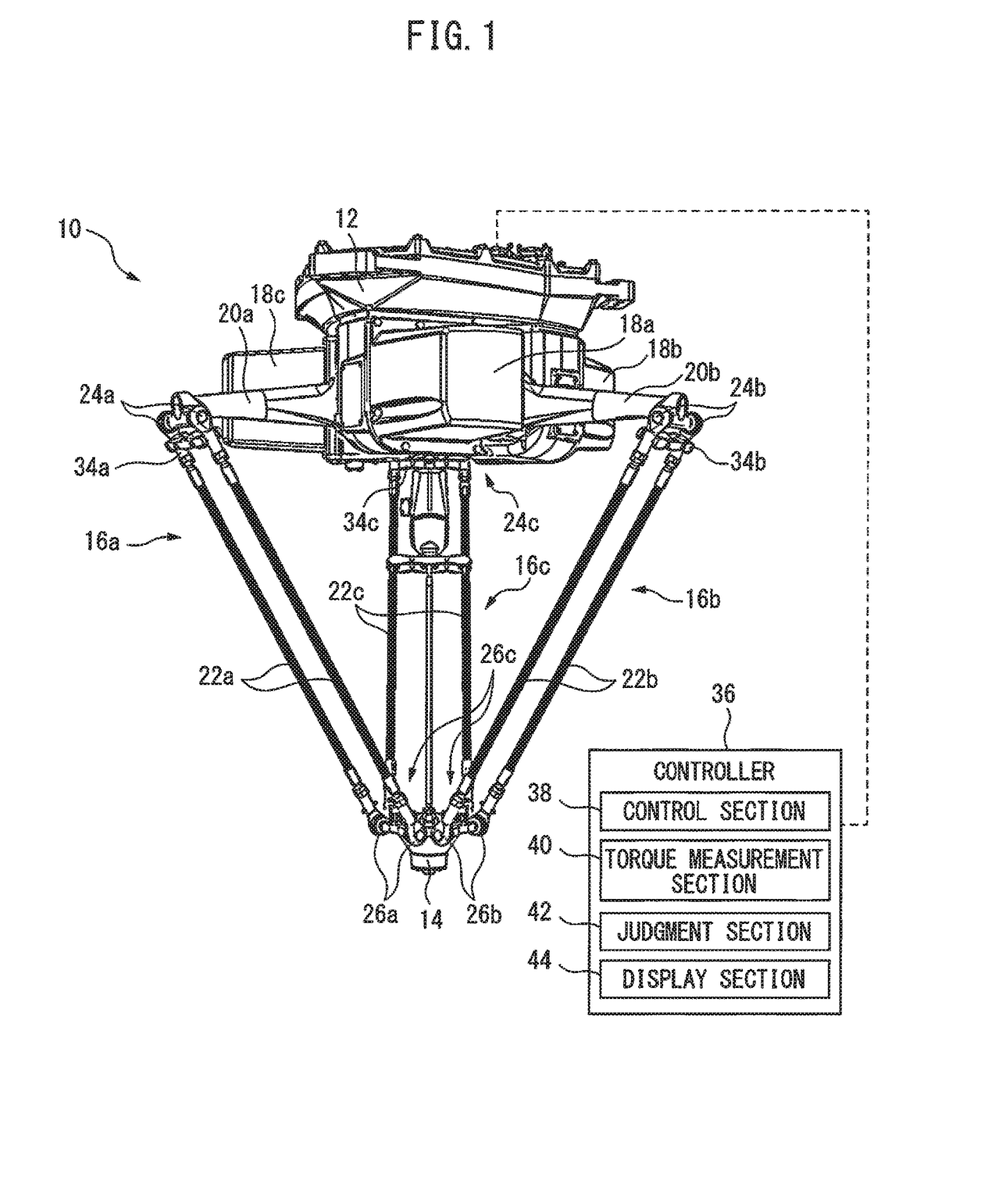
FIG. 1 is a view showing a schematic configuration of a delta-type parallel link robot, to which a method and device for detecting an abnormality according to a preferred embodiment of the present invention can be applied.

FIG. 1 is a view showing a schematic configuration of a delta-type parallel link robot 10, to which a method and device for detecting an abnormality according to a preferred embodiment of the present invention can be applied. Parallel link robot 10 has a base part 12; a movable part 14 positioned away from (normally, positioned below) base part 12; two or more (in the illustrated embodiment, three) link parts 16a, 16b and 16c which connect movable part 14 to base part 12, each link part including one degree-of-freedom relative to base part 12; and a plurality of (normally the same number as the link parts, and in the illustrated embodiment, three) motors 18a, 18b and 18c which respectively drive link parts 16a, 16b and 16c. To movable part 14, an end effector (schematically shown in FIGS. 6 and 7) such as a robot hand can be attached.

Link part 16a is constituted by a drive link 20a connected to base part 12 and a pair of (two) passive links 22a which extend parallel to each other and connect drive link 20a to movable part 14. Drive link 20a and passive links 22a are connected to each other by a pair of (two) first ball joints (or spherical joints) 24a. Further, movable part 14 and passive links 22a are connected to each other by a pair of (two) second ball joints (or spherical joints) 26a.

Figure 2:
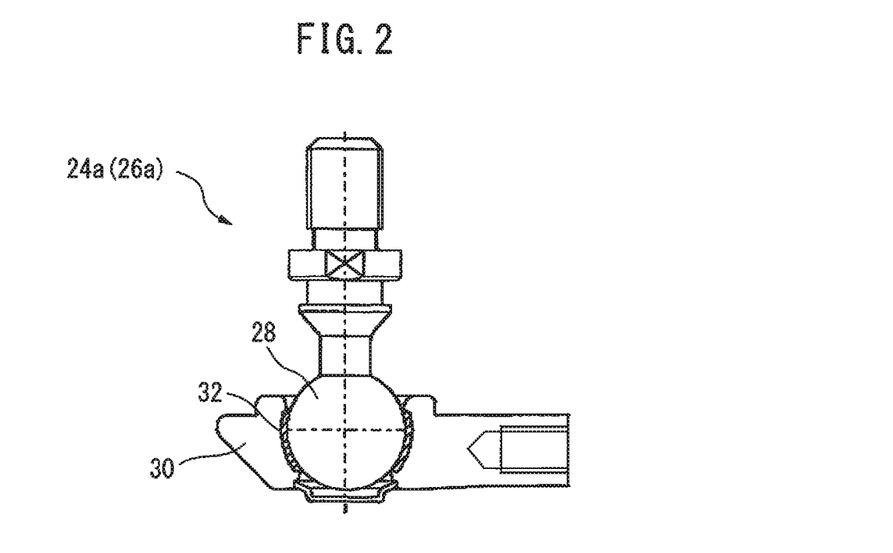
FIG. 2 is a partially enlarged view of a structure of each ball joint of the parallel link robot of FIG. 1.

FIG. 2 is a partially enlarged view of a structure (or a link ball structure) of each ball joint (in this case, ball joints 24a or 26a) of parallel link robot 10. Ball joint 24a has a ball 28 (fixed to drive link 20a), a housing 30 (fixed to one of passive links 22a) for containing ball 28, and a liner 32 positioned between ball 28 and housing 30. Similarly, ball joint 26a has a ball 28 (fixed to movable part 14), a housing 30 (fixed to the other of passive links 22a) for containing ball 28, and a liner 32 positioned between ball 28 and housing 30. Further, as shown in FIG. 1, at the drive link side (or the upper part) of the passive links, parallel link robot 10 has a restraining plate 34a positioned and connected between the housings of first ball joints 24a so as to restrict a rotation of two parallel passive links 22a about each axis of the robot.

Other link parts 16b and 16c may have the same configuration as link part 16a. Therefore, the components of link parts 16b and 16c corresponding to the components of link part 16a are provided with respective reference numerals in which only the last character is different from the reference numeral of link part 16a (e.g., the components of link parts 16b and 16c corresponding to passive link 22a are provided with reference numerals 22b and 22c, respectively), and a detailed explanation thereof will be omitted.

As schematically shown in FIG. 1, parallel link robot 10 has a controller 36 configured to control parallel link robot 10. Concretely, controller 36 has: a control section 38 configured to control the motion of parallel link robot 10; a torque measurement section 40 configured to measure or calculate, during parallel link robot 10 is operated, an amount of change in a drive torque, based on a current value of the motor, before and after robot 10 represents a specified posture where a sign (plus/minus or a direction) of a relative angular velocity between ball 28 and housing 30 of the ball joint is changed; and a judgment section 42 configured to judge that, when the amount of change in the drive torque measured by torque measurement section 40 exceeds a predetermined threshold, a friction state of the ball joint corresponding to the motor is abnormal. Controller 38 may further have a display section 44 configured to display a result of judgment section 42 for an operator. In this embodiment, a device or a function for detecting the abnormality of the joint part of the robot (e.g., a current sensor for measuring the motor current and/or a CPU for judging the abnormality) may be incorporated into controller 36. Otherwise, such a device or a function may be provided to another device, such as a (personal) computer, which is associated with parallel link robot 10.

Functionally, in the delta-type parallel link robot, during horizontal movement of a front end such as the hand, there may be a timing when the sign (or the direction) of the relative angular velocity between the ball and the housing of the ball joint is changed. In this regard, when the friction in the ball joint is negligible, the drive torque is not affected by the friction. On the other hand, when the friction torque is relatively large, the drive torque may be considerably affected, since the sign (direction) of the friction force may be precipitously changed.

Figure 3:
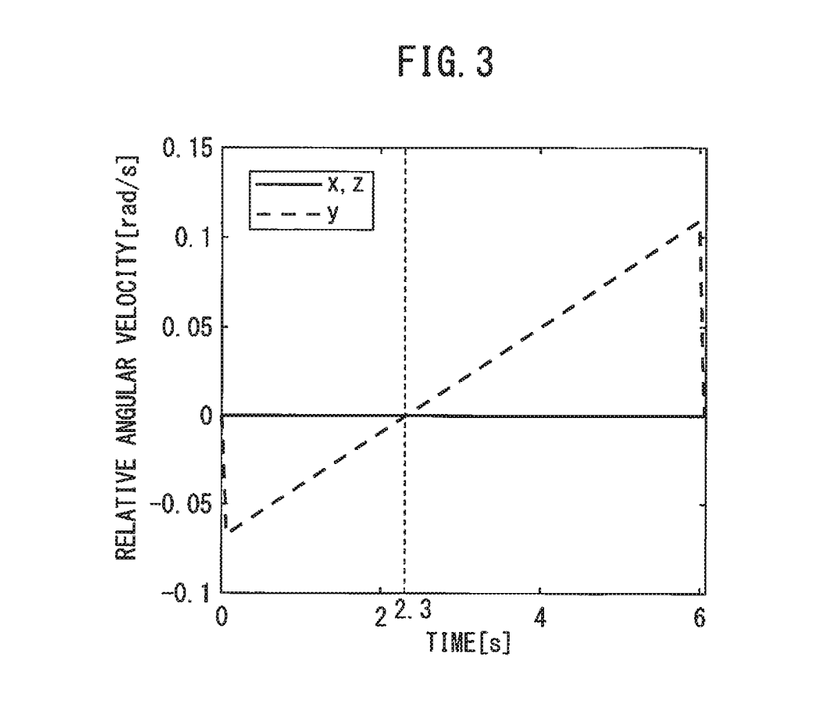
FIG. 3 is a graph showing a temporal change in a relative angular velocity between a ball and a housing of the ball joint.
Figure 4:
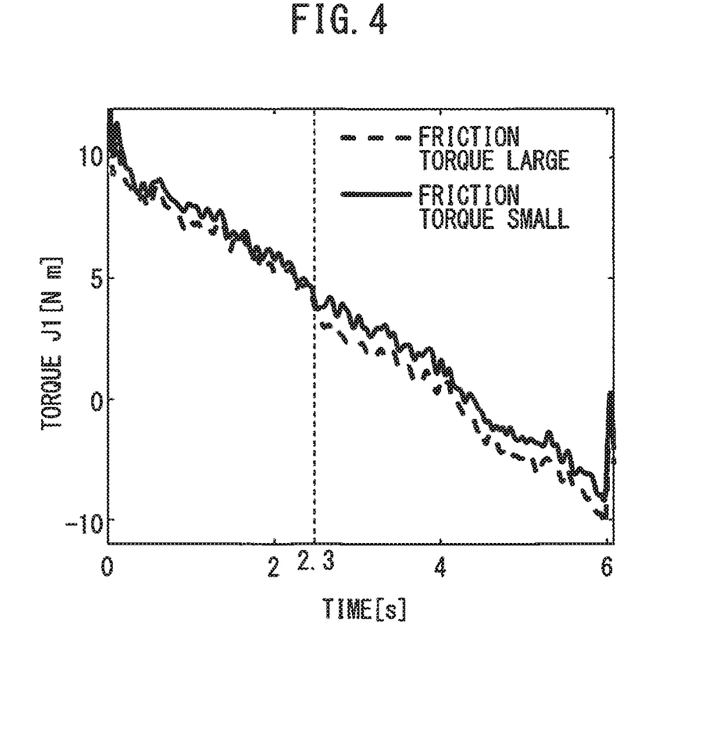
FIG. 4 is a graph showing a temporal change in a friction torque in the ball joint.

FIGS. 3 and 4 are graphs explaining an example of a procedure for detecting an abnormality (e.g., excess friction) of the joint part (ball joint) of parallel link robot 10 based on the change in the drive torque as described above. Even when the front end (e.g., a tool center point) of the robot is moved at a constant velocity in the horizontal direction (along an X-axis), as shown in FIG. 3, among the relative angular velocities (X, Y, Z) of the ball joint of J1 axis (see FIG. 6 as described below), the sign of the relative angular velocity about the Y-axis may be changed at a certain timing (at 2.3 seconds in the example of FIG. 3).

On the other hand, FIG. 4 shows a temporal change in the torque (J1) calculated from the current value of motor 18a, with respect to two cases, i.e., one case in which the friction of the ball joint is relatively small (a solid line), and the other case in which the friction of the ball joint is relatively large (a dashed line). As shown in FIG. 4, with respect to the drive torque at the timing (2.3 seconds) when the sign of the relative angular velocity about a certain axis is changed, the drive torque is changed in a stepwise manner when the friction of the ball joint is large. Therefore, by observing or monitoring the stepwise change at this timing, the abnormality can be detected. In other words, the amount of change in the drive torque is calculated or obtained, based on current value of the motor measured at predetermined time intervals, before and after the robot represents the specified posture where the sign of the relative angular velocity between the ball and the housing of each ball joint, and then it can be judged that, when the amount of change in the drive torque exceeds the predetermined threshold (e.g., 0.8 N·m before and after a time point of 2.3 seconds), the friction state of the ball joint corresponding to the motor is abnormal.

Since the ball joint is a passive joint, it is difficult to directly detect occurrence or existence of the abnormality from the motor torque of the drive side. However, the inventors found that, when the sign (direction) of the relative angular velocity between the ball and the housing of the ball joint is changed during the movable part is moved on a path at a constant velocity, the drive torque of the motor is changed in a stepwise manner between before and after the change in the drive torque.

Figure 5:
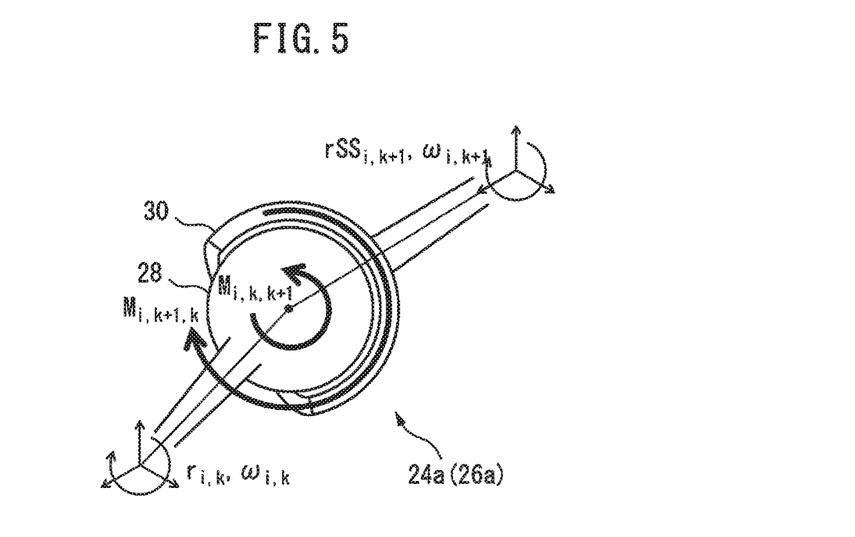
FIG. 5 is a view showing an example of a friction model of the ball joint.
Figure 6:
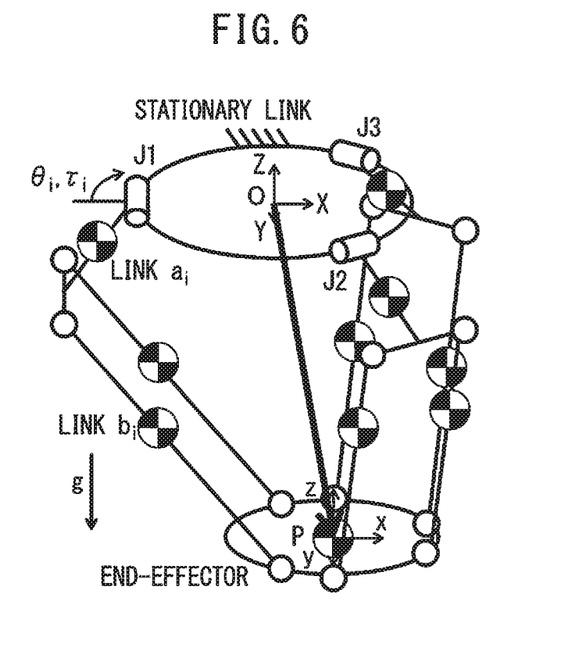
FIG. 6 is a view showing an example of a structural model of the parallel link robot.
Figure 7:
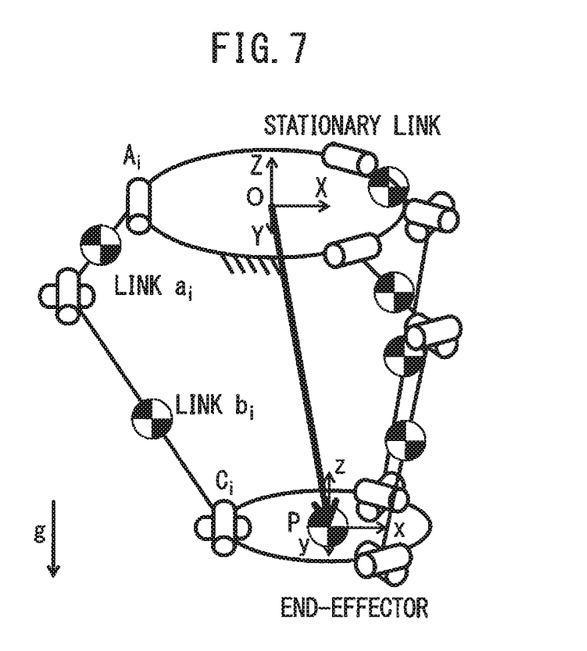
FIG. 7 is a view showing a simplified model equivalent to the model of FIG. 6.

In the example with reference to FIGS. 3 and 4, increase in the friction torque can be detected, whereas it may be difficult to detect as to where (at which ball joint) the friction is excessively increased. Therefore, by constituting a friction model of the ball joint (spherical joint) as shown in FIG. 5, and by identifying the magnitude of the friction torque at each portion of the model from the drive torque, a concrete position where the friction is excessively increased can be identified. In this regard, FIG. 6 shows a structural model corresponding to parallel link robot 10 of FIG. 1. However, in order to simplify the calculation, a simplified model as shown in FIG. 7, which is equivalent to the model of FIG. 6, may be used. Hereinafter, an example of a method for detecting the abnormality when the model of the ball joint (spherical joint) having the friction force (friction torque) as shown in FIG. 5 is applied to the equivalent model of FIG. 7.

As represented by equation (1), the friction torque in the ball joint may be approximated so that the friction torque has a constant magnitude. In equation (1), the friction torque applied to k-th link from k+1-th link in i-th chain is represented as $M_{i,k,k+1}$. In this regard, as shown in FIG. 5, the angular velocity of each link constituting the ball joint is represented as $\omega_{i,k}$ and $\omega_{i,k+1}$, and the magnitude of the friction torque in each ball joint $S_{i,k}$ is represented as $M_{i,k}$. In addition, equation (2) represents a relationship between friction torque $M_{i,k,k+1}$ and friction torque $M_{i,k+1,k}$ applied to k+1-th link from k-th link in i-th chain.

$$M_{i,k,k+1} = M_{i,k} \frac{\omega_{i,k+1} - \omega_{i,k}}{|\omega_{i,k+1} - \omega_{i,k}|} \quad (1)$$

$$M_{i,k+1,k} = -M_{i,k,k+1} \quad (2)$$

Equations (1) and (2) can be applied to a dynamics analysis of the parallel link robot, when the friction torque is considered as an external force applied to each link. For example, herein, an analysis based on d'Alembert's principle will be explained. When d'Alembert's principle is used, a dynamics relationship in the system may be represented by equation (3). Further, $F_{i,k}$ in equation (3) can be represented by equation (4), and $f_{i,k}$ and $m_{i,k}$ in equation (4) can be represented by equations (5) and (6).

$$\tau = [\tau_1, \tau_2, \tau_3]^T \quad (3)$$
$$= \sum_{\substack{i=1,2,3 \\ k=1,2}} (J_{i,k}^T F_{i,k}) + J_3^T F_3 +$$
$$\sum_{\substack{i=1,2,3 \\ k=1,2}} \left(J_{i,k}[M_{i,k,k+1}^T \ 0]^T + J_{i,k+1}[M_{i,k+1,k}^T \ 0]\right)^T$$

$$F_{i,k} = [m_{i,k}^T \ f_{i,k}^T]^T \quad (4)$$

$$\begin{cases} f_{i,k} = m_k(g - \ddot{r}_{i,k}) & (5) \\ m_{i,k} = -R_{i,k} I_k R_{i,k}^T \dot{\omega}_{i,k} - \omega_{i,k} \times (R_{i,k} I_k R_{i,k}^T \omega_{i,k}) & (6) \end{cases}$$

In equation (3), the first and second terms on the right hand indicate quantities due to inertia and gravity, and the third term on the right hand indicates a quantity due to the friction force of the ball joint. In addition, $m_k$, g, $I_k$, $R_{i,k}$, $\omega_{i,k}$, $r_{i,k}$ and $J_{i,k}$ in equation (5) or (6) indicate a mass of each link, a gravity acceleration, an inertia tensor, a posture conversion matrix, an angular velocity, a translational displacement and a Jacobian matrix, respectively.

As described above, based on the change in the drive torque at time point t' (e.g., 2.3 seconds in FIG. 3) when the sign of the relative angular velocity between the components of the ball joint is changed, the magnitude of the friction torque in each ball joint can be identified by using equation (3). In equation (3), the largest change in drive torque τ between before and after time point t' is caused by the term regarding the friction torque of the ball joint. Therefore, following equation (7) may be obtained, by neglecting the terms other than the third term in equation (3) so as to calculate Δτ of the drive torque between before and after time point t'.

$$\Delta \tau = \Delta \sum_{\substack{i=1,2,3 \\ k=1,2}} \left( J_{i,k} [M_{i,k,k+1}^T \ 0]^T + J_{i,k+1} [M_{i,k+1,k}^T \ 0]^T \right) \quad (7)$$

In equation (7), the character "Δ" means the difference regarding the variable attached thereto, between before and after time point t'. Therefore, following equation (8) can be introduced from equations (1), (2) and (7).

$$\Delta \tau = \sum_{\substack{i=1,2,3 \\ k=1,2}} \left( M_{i,k} \Delta \left( \frac{\omega_{i,k+1} - \omega_{i,k}}{|\omega_{i,k+1} - \omega_{i,k}|} \right) (J_{i,k} - J_{i,k+1}) \right) \quad (8)$$

Apparent from equation (8), there is a linear relationship between Δτ and a regression coefficient Ms $(=[M_{1,1} \ldots M_{3,2}]^T$. therefore, equation (8) can be rewritten as equation (9).

$$\Delta \tau = A M_S \quad (9)$$

In this regard, Δτ can be considered as the stepwise change in the drive torque, and thus Δτ may be approximated as a variable $X_3$ as represented by following equation (10). In equation (10), values $\tau_{measured}$ and $\tau_{simulated}$ correspond to an actual measured value and an analysis (estimated) value of the friction torque of the ball joint, respectively.

$$X_3 = \quad (10)$$
$$\frac{1}{\Delta t} \left( \sum_{t'+\delta t}^{t'+\delta t+\Delta t} (\tau_{measured} - \tau_{simulated}) dt - \int_{t'+\Delta t}^{t'} (\tau_{measured} - \tau_{simulated}) dt \right)$$

In equation (10), $X_3$ and A are variables determined in each motion, and thus regression coefficient Ms can be identified by a multivariable linear regression method using a least-square approach, etc. For example, regression coefficient Ms can be calculated from following equation (11). In addition, the character "j" in equation (11) is a variable assigned to each motion of the robot.

$$M_s = \left( \sum_j (A_j^T A_j) \right)^{-1} \sum_j (A_j^T X_{3,j}) \quad (11)$$

Figure 8:
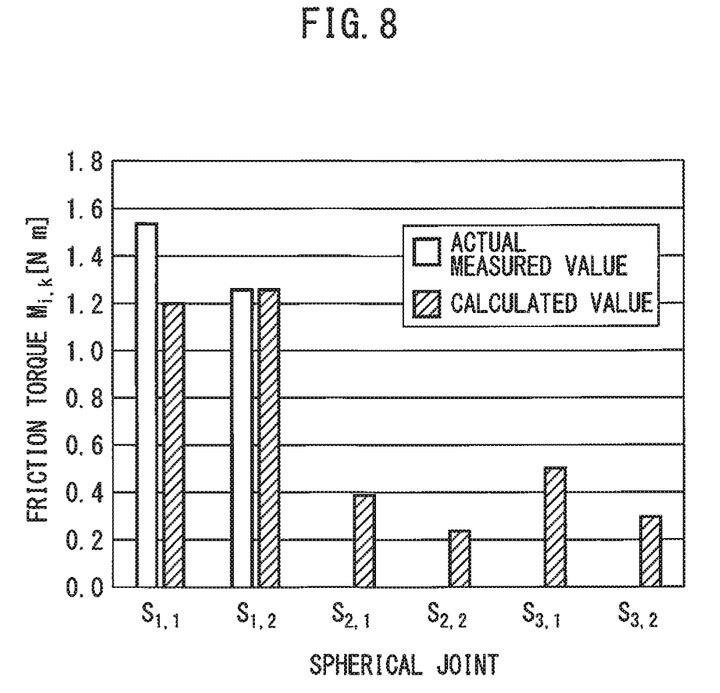
FIG. 8 is a graph showing an example of a result of identification of the friction torque.

FIG. 8 shows the friction torque of each ball joint calculated by using equation (11), while comparing to the actual measured value thereof. In FIG. 8, ball joints $S_{1,1}$ and $S_{1,2}$ may correspond to first ball joint 24a and second ball joint 26a in FIG. 1, respectively. Similarly, ball joints $S_{2,1}$ and $S_{2,2}$ may correspond to ball joints 24b and 26b in FIG. 1, respectively, and ball joints $S_{3,1}$ and $S_{3,2}$ may correspond to ball joints 24c and 26c in FIG. 1, respectively.

As shown in FIG. 8, in either of ball joints $S_{1,1}$ and $S_{1,2}$ where the friction torque is relatively large, the obtained analysis (calculated) value is very close to the actual measured value, and thus the identification of the friction force in the embodiment is significantly effective. Therefore, in the embodiment, the friction torque of each ball joint of the parallel link robot can be precisely estimated, and the position and degree of the malfunction (frictional abnormality) can be identified.

In the above embodiment, the friction torque of each ball joint of the parallel link robot is identified by utilizing the multivariable linear regression method using the dynamics analysis, with respect to the obtained amount of change in the drive torque, based on the dynamics model of the parallel link robot including the friction force model of the ball joint and mechanical parameters including loads of the workpiece and the hand (end effector) attached to movable part 14, information of inertia, and a mass and dimensions of parallel link robot 10. Although the d'Alembert's principle is used in the above embodiment, another method such as a Newton-Euler method or a Lagrangian method may be used.

According to the present invention, the abnormality of the joint part of the delta-type parallel link robot can be easily and rapidly detected by monitoring the friction torque of the joint part. Therefore, a production line including the robot can be prevented from being unexpectedly suspended or stopped, by repairing or exchanging the component of the ball joint.

While the invention has been described with reference to specific embodiments chosen for the purpose of illustration, it should be apparent that numerous modifications could be made thereto, by one skilled in the art, without departing from the basic concept and scope of the invention.

The invention claimed is:
1. A method for detecting an abnormality of a joint part of a parallel link robot, the parallel link robot comprising:
   a base part;
   a movable part positioned away from the base part;
   two or more link parts which connect the movable part to the base part, each link part including one degree-of-freedom relative to the base part; and
   a plurality of motors configured to respectively drive the link parts,
   wherein each link part comprises:
      a drive link connected to the base part;
      two passive links which extend parallel to each other and connect the drive link to the movable part;
      a pair of first ball joints which connect the passive links to the drive link;
      a pair of second ball joints which connect the passive links to the movable part; and
      a restraining plate positioned between the pair of first ball joints so as to restrict a rotation of the two passive links about each axis of the robot,
   the method comprising:
      measuring, while the parallel link robot is operated, an amount of change in a drive torque, based on a current value of the motor, before and after the robot represents a specified posture where a sign of a relative angular velocity between a ball and a housing of each of the first and second ball joints is changed; and
      judging, in response to the amount of change in the drive torque exceeding a predetermined threshold, that a friction state of the ball joint corresponding to the motor is abnormal, wherein the ball joint is repaired or exchanged upon judging that the friction state of the ball joint is abnormal based on the measured amount of change in the drive torque exceeding the predetermined threshold.

2. The method as set forth in claim 1, further comprising:

identifying a friction torque of each ball joint of the parallel link robot by utilizing a multivariable linear regression method using a dynamics analysis, with respect to the obtained amount of change in the drive torque, based on a dynamics model of the parallel link robot including a friction force model of the ball joint and mechanical parameters including loads of a workpiece and a hand attached to the movable part, information of inertia, and a mass and dimensions of the parallel link robot; and determining a position where a malfunction occurs and a degree of the malfunction.

3. A device for detecting an abnormality of a joint part of a parallel link robot, the parallel link robot comprising:

a base part;

a movable part positioned away from the base part;

two or more link parts which connect the base part and the movable part, each link part including one degree-of-freedom relative to the base part; and a plurality of motors configured to respectively drive the link parts, wherein each link part comprises:

a drive link connected to the base part;

two passive links which extend parallel to each other and connect the drive link to the movable part;

a pair of first ball joints which connect the passive links to the drive link;

a pair of second ball joints which connect the passive links to the movable part; and a restraining plate positioned between the pair of first ball joints so as to restrict a rotation of the two passive links about each axis of the robot, and wherein the device comprises:

a torque measurement section configured to measure, while the parallel link robot is operated, an amount of change in a drive torque, based on a current value of the motor, before and after the robot represents a specified posture where a sign of a relative angular velocity between a ball and a housing of each of the first and second ball joints is changed;

a judgment section configured to judge, in response to the amount of change in the drive torque exceeding a predetermined threshold, that a friction state of the ball joint corresponding to the motor is abnormal; and a display section configured to display a result of judgement that the friction state of the ball joint is abnormal to prompt repair or exchange of the ball joint.

* * * * *